United States Patent [19]

Monson

[11] 4,162,976

[45] Jul. 31, 1979

[54] SEWAGE DISPOSAL SYSTEM

[76] Inventor: Arnold A. Monson, 6516 Zane Ave., Apt. 204, Minneapolis, Minn. 55429

[21] Appl. No.: 910,867

[22] Filed: May 30, 1978

[51] Int. Cl.$^2$ .................. B01D 1/00; B01D 21/10; B01D 21/24; C02C 1/16
[52] U.S. Cl. .................. 210/170; 210/248; 210/261; 210/262; 210/320
[58] Field of Search .............. 210/153, 170, 248, 259, 210/261, 262, 320, 538, 540; 61/10, 11; 52/169.6, 169.14; 203/12

[56] References Cited

U.S. PATENT DOCUMENTS

| 2,796,176 | 6/1957 | Monson | 210/261 |
| 3,097,166 | 7/1963 | Monson | 210/170 |
| 3,925,206 | 12/1975 | Dea | 210/104 |
| 4,039,451 | 8/1977 | Smith | 210/170 |

FOREIGN PATENT DOCUMENTS 2731887 1/1978 Fed. Rep. of Germany ........... 210/170

OTHER PUBLICATIONS

Engineering News, "Subdrainage of Earth Roads," Apr. 29, 1915, vol. 73, No. 17, p. 828.

Primary Examiner—Charles N. Hart
Assistant Examiner—David R. Sadowski
Attorney, Agent, or Firm—Williamson, Bains, Moore & Hansen

[57] ABSTRACT

A system of waste treatment and disposal which receives and completely destroys waste solids biochemically and disposes of the effluent by total evaporation within a sealed dispersion reservoir surrounding a two stage tank assembly. Raw sewage is reduced in first and second stages of anaerobic digestion in upper and lower tank units of a double tank assembly. Liquid effluent is forced outwardly through discharge openings in the lower tank unit and upwardly through a rock bed in the dispersion reservoir under the pressure of a liquid column in the upper tank unit. The liquid effluent evaporates in the rock bed as a third stage of disposal, with the resulting vapors being filtered through a sand bed over the rock bed and dispersed to the atmosphere in a fourth and final stage.

17 Claims, 5 Drawing Figures

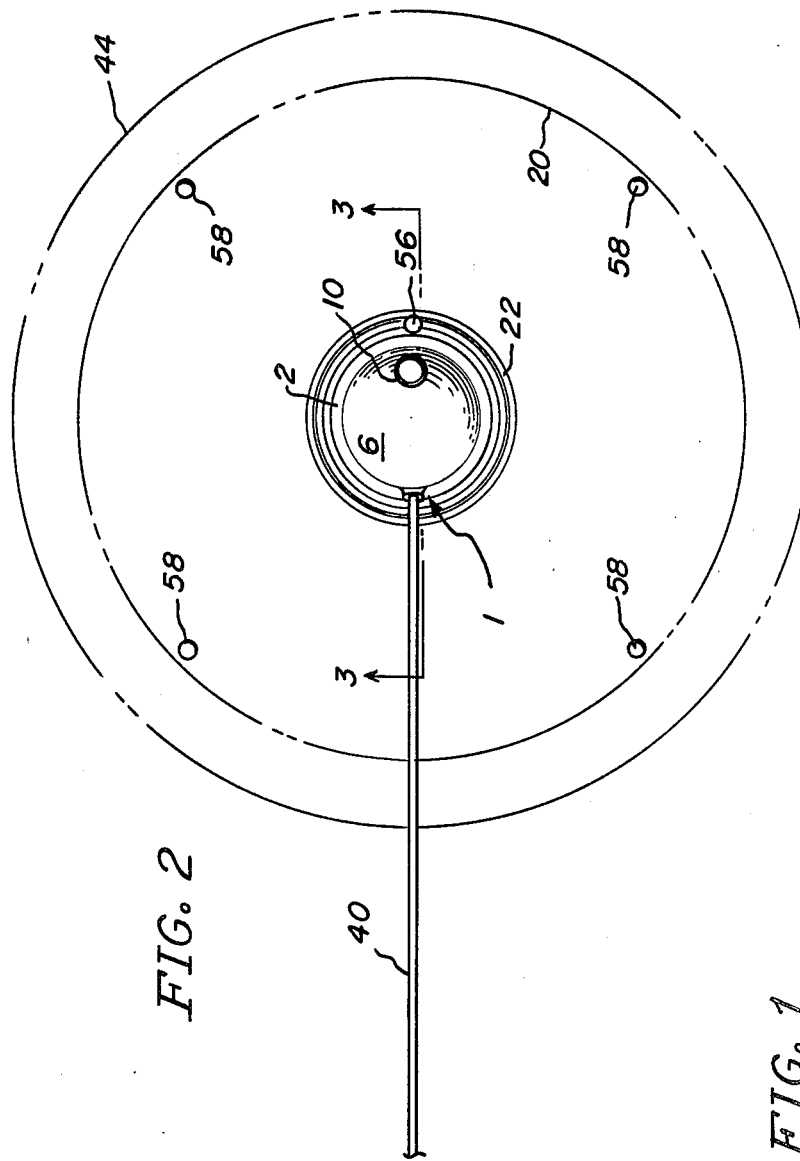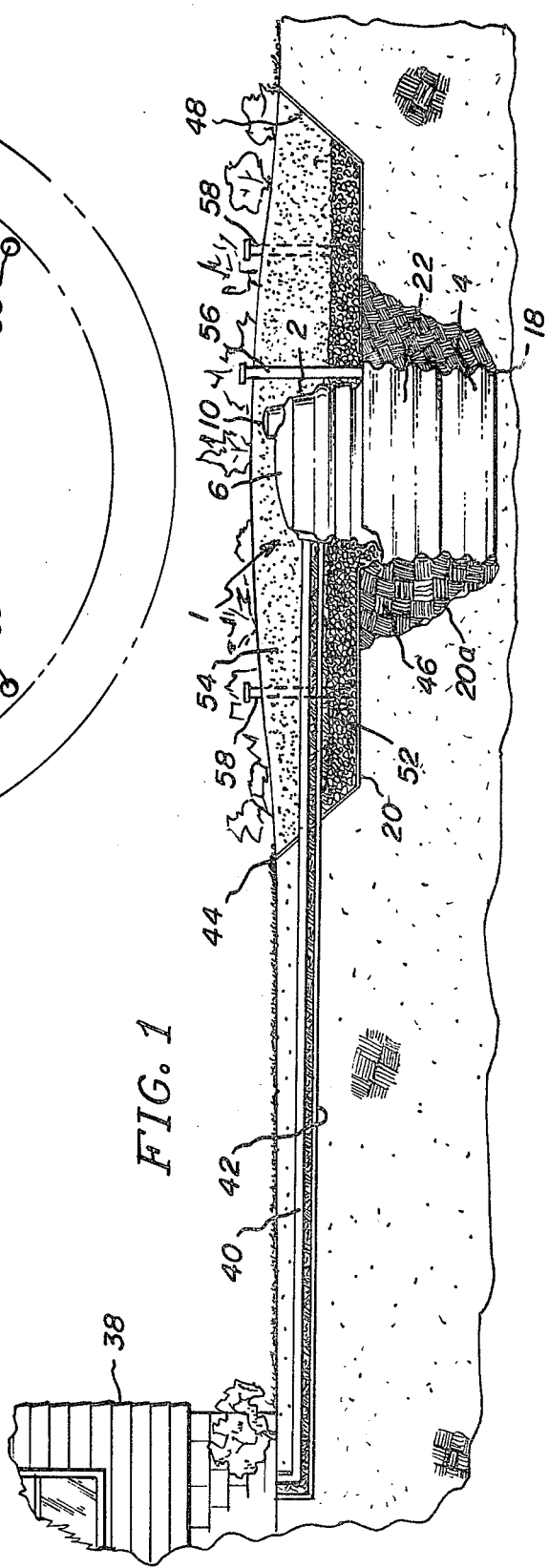

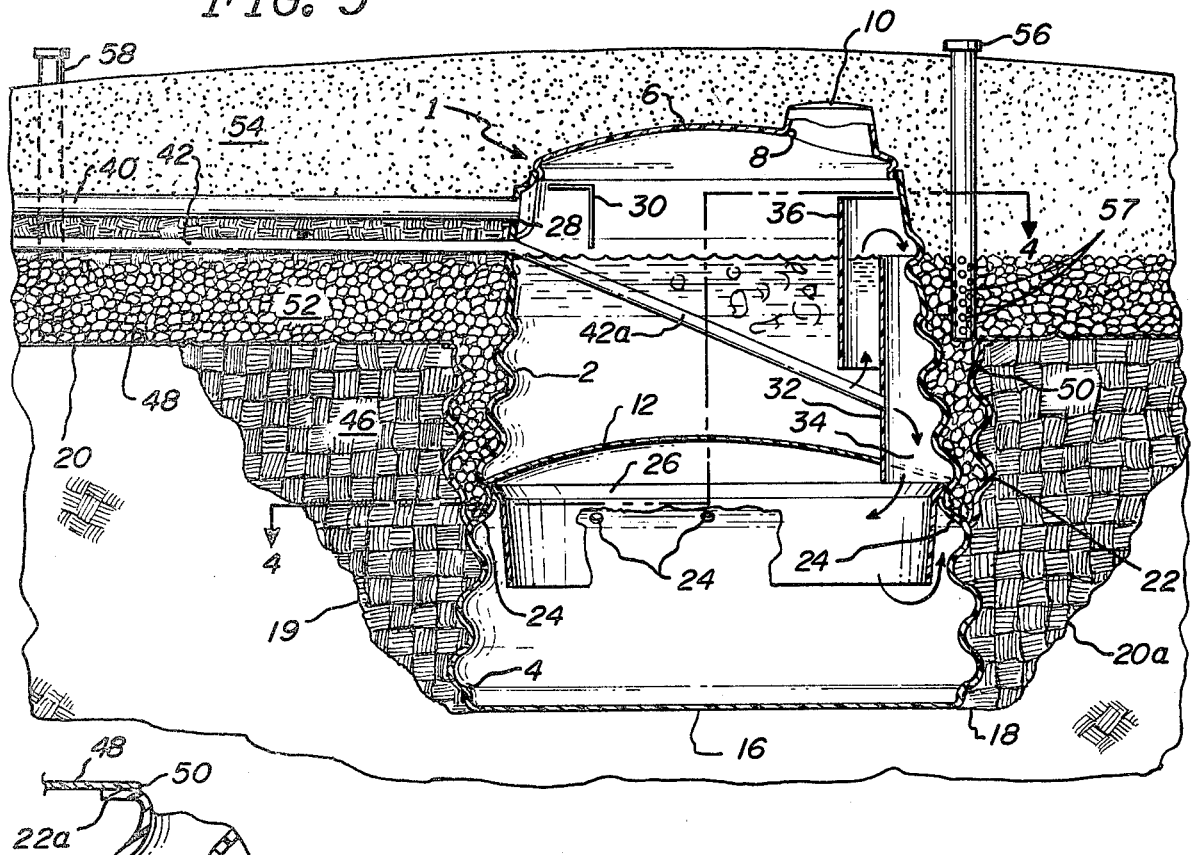
FIG. 3
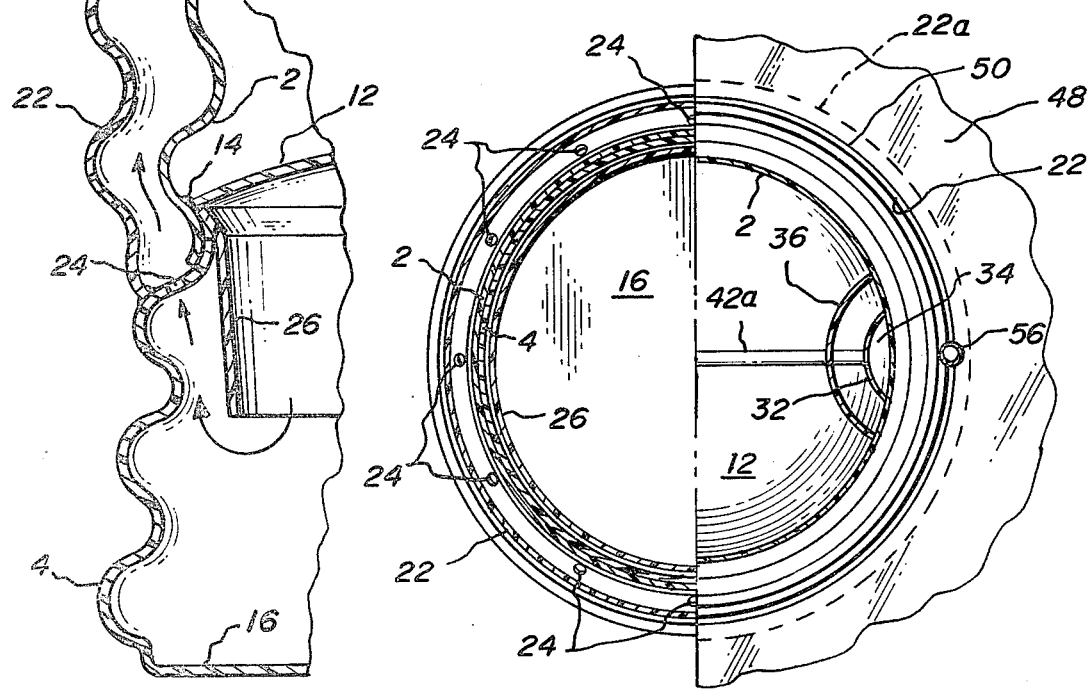
FIG. 5
FIG. 4

SEWAGE DISPOSAL SYSTEM

BACKGROUND OF THE INVENTION

Sewage disposal systems comprised of septic tanks and cesspools are well known. In my previously issued U.S. Pat. Nos. 2,796,176 and 3,097,166 I have disclosed septic tank and cesspool structures which have greatly improved such systems. Even those improved systems suffered from the disadvantage that liquid effluent was discharged into the surrounding ground, with the resulting possibility of pollution of the ground water, lakes and streams.

The sewage disposal system disclosed herein represents a significant advancement in waste water treatment in that it will function continuously without pollution of the soil or any water source such as a well, lake or stream. This is accomplished by forcing the liquid effluent from a two stage, anaerobic digestion tank assembly into a sealed dispersion reservoir from which the liquid effluent is totally disposed of by total evaporation to the surrounding atmosphere.

BRIEF SUMMARY OF THE INVENTION

This invention is directed to a four stage, sewage disposal system wherein sewage from residential or commercial buildings is received in an underground tank assembly, reduced by anaerobic digestion in two stages and then dispersed to the surrounding atmosphere by total evaporation, to thereby avoid pollution of the surrounding soil and ground waters.

This basic objective is realized by utilizing a double tank unit positioned within an excavation defining a dispersion reservoir which is sealed to contain liquid effluent discharging from the two stage tank assembly. Baffle means in the upper tank unit of an upper and lower double tank assembly defines a generally vertically extending flow passage in which a liquid column is maintained and through which liquid flows from the upper tank unit into the lower tank unit in the course of two initial stages of anaerobic digestion.

As a particularly beneficial aspect of my invention, the aforesaid liquid column forces liquid effluent from the lower tank unit outwardly through discharge openings in the sidewalls thereof into the surrounding, sealed reservoir. Evaporation of the liquid effluent to the atmosphere from the sealed reservoir is greatly accelerated by the pressurizing effect of the liquid column, as well as by the heating of the liquid effluent as a result of the heat generated by anaerobic bacterial action in the first and second stages of digestion within the upper and lower tank units.

Preferably, a layer of rock of specially selected size and grade is provided on the bottom of the excavation forming the dispersion reservoir, and a layer of sand is spread on top of the rock layer. The specially selected rock and sand layers provide for larger void space. This allows air to circulate at the liquid-air interface, causing evaporation of the liquid effluent below the ground surface, within the sealed reservoir.

To ensure that liquid effluent is contained within the aforesaid reservoir excavation, the surface of the excavation is preferably sealed by a liquid impervious, plastic liner sheet. Liquid effluent from the lower tank unit is advantageously contained and forced upwardly into the rock and sand beds by a generally vertically extending collar encircling the tank assembly in outwardly spaced relation with respect thereto. The collar is sealed to the outside of the lower tank unit around its lower periphery at a level below discharge apertures in the sidewalls thereof. The plastic liner has a central opening through which the tank assembly extends, and the liner is sealed around this opening to the top periphery of the collar.

These and other objects and advantages of my invention will become readily apparent as the following description is read in conjunction with the accompanying drawings wherein like reference numerals have been used to designate like elements throughout the several views.

BRIEF DESCRIPTION OF THE DRAWINGS

FIG. 1 is a side elevation view of the sewage disposal system of this invention;

FIG. 2 is a top, plan view of the system of FIG. 1, with portions of the evaporation beds removed to show a tank assembly forming a portion of the sewage disposal system;

FIG. 3 is a vertical section view through the tank assembly and surrounding dispersion reservoir of the sewage disposal system, taken along lines 3—3 of FIG. 2;

FIG. 4 is a horizontal section view taken along lines 4—4 of FIG. 3; and

FIG. 5 is a fragmentary, vertical section view showing a portion of the tank assembly of FIG. 3.

DESCRIPTION OF THE PREFERRED EMBODIMENT

Referring now to the drawings, I have shown in FIGS. 1-3 a preferred embodiment of the sewage disposal system of this invention. The system includes a tank assembly generally indicated by reference numeral 1, and most clearly shown in FIG. 3 as having an upper tank unit 2, and a lower tank unit 4. Although these tanks may assume various shapes, they are preferably of frustro-conical configuration. Upper tank unit 2 has a dome shaped top wall which is separate and removable from the sidewalls of the upper tank unit. An inspection and service opening 8 is formed in top wall 6, and is normally closed by a removable cover 10. The bottom of upper tank unit 2 fits down over the top of lower tank unit 4 and removably rests thereon as is shown most clearly in FIG. 5. The bottom of upper tank unit 2 is closed by a preferably convex or dome shaped divider wall 12 sealed around its periphery to the inner face of the sidewalls of tank unit 2 as indicated by reference numeral 14 in FIG. 5. The sidewalls of upper and lower tank units 2 and 4 are preferably of corrugated configuration defining a plurality of peripheral ribs extending circumferentially around each tank unit. With such a tank construction, the bottom rib segment of upper tank unit 2 will rest on the outside of an inwardly and upwardly extending rib segment around the top periphery of bottom tank unit 4, as shown in FIG. 5. The particular, frustro-conical shape of the upper and lower tank units, and the use of a removable top wall 6 on upper tank unit 2 permits convenient nesting of the tank units during shipment and storage. Installation is simplified by simply placing upper tank unit 2 on top of lower tank unit 4, and then placing top wall 6 on top of the upper tank unit.

Lower tank unit 4 has a solid bottom wall 16 which closes its lower end. This is in contrast with the tank structure disclosed in my previously issued U.S. Pat.

No. 3,097,166 which had an open bottom on a lower or cesspool tank unit. In contrast with that tank structure and system, the liquid effluent from the tank assembly disclosed herein is not permitted to drain downwardly into the surrounding ground, but is directed upwardly in a controlled manner as hereinafter set forth.

Before the tank assembly comprising upper and lower tank units 2 and 4 is installed in the ground, an excavation is dug. This excavation is preferably in two levels. A first excavation is dug to a depth on the order of three feet, the bottom of this excavation being indicated by reference numeral 20 in FIG. 3. A second, deeper excavation is dug to a further depth on the order of five feet below excavation 20, the bottom of this deeper or second excavation being indicated by reference numeral 18. The bottom wall 16 of lower tank unit 4 rests on excavation 18. The installation of the tank assembly within the excavation is facilitated by manufacturing the tanks from lightweight material. Fiberglass reinforced plastic has proven to be an effective, almost indestructible material for the construction of the tank units. This material will not rust or corrode.

For a purpose hereinafter explained, an annular collar 22 is provided around the tank assembly. Collar 22 extends generally vertically and encircles the tank assembly in outwardly spaced relation with respect thereto so as to define an annular, effluent flow space therebetween. The bottom edge of collar 22 is sealed to one of the upwardly and inwardly extending rib surfaces of lower tank unit 4 in the manner shown in FIG. 5. The bottom periphery of collar 22 abuts the outside of lower tank unit 4 at a level below discharge means from the lower tank unit. Preferably, such discharge means takes the form of a plurality of apertures 24 circumferentially spaced around the outer periphery of lower tank unit 4. In order to direct effluent liquid upwardly as hereinafter explained, apertures 24 are formed in an upwardly and inwardly inclined face of one of the outwardly convex ribs of lower tank unit 4 as shown in FIG. 5. Liquid effluent is directed from the inside of lower tank unit 4 outwardly and upwardly towards discharge apertures 24 by a generally cylindrical guide baffle 26 secured at its upper end to the inside face of the sidewalls of lower tank unit 4 at a location above discharge apertures 24. Its cylindrical walls are spaced inwardly from the adjacent sidewalls of the lower tank unit as shown in FIGS. 3 and 4.

Upper tank unit 2 has an inlet port 28 in its upper end, opposite which a splash baffle 30 is mounted to preclude turbulence and splashing as sewage is introduced into the upper tank unit. A baffle 32 in the form of a tubular segment as shown most clearly in FIGS. 3 and 4 extends vertically in upper tank unit 2 and abuts against the inner face of the sidewalls thereof. Baffle 32 is preferably disposed opposite inlet port 28 and defines with the sidewall portion of upper tank unit 2 against which it abuts a generally vertically extending flow passage 34 through which liquid flows from the upper tank unit into the lower tank unit. The top end of baffle 32 serves as an inlet to flow passage 34 and maintains the fluid in upper tank unit 2 at a predetermined level. A second, vertically extending baffle 36 is also utilized in upper tank unit 2 and extends above the liquid level therein as shown in FIG. 3 to prevent sludge and solid materials from flowing downwardly into flow passage 34. Baffle 36 is also a tubular segment, larger than tubular baffle segment 32 and spaced outwardly therefrom in abutting engagement with the sidewalls of tank unit 2 as shown in FIG. 4. It is to be noted that the bottom end of baffle 34 extends downwardly through bottom wall 12 of upper tank unit 2 into the top space within lower tank unit 4. This arrangement provides fluid flow communication between tank units 2 and 4 through flow passage 34.

In FIG. 1, 38 indicates a residential building in conjunction with which the sewage disposal system of this invention may be utilized. A relatively large diameter pipe 40 is extended from the residence to inlet port 28 in upper tank unit 2. This pipe will normally have a diameter on the order of four inches. It is utilized to convey heavy sewage having solid materials therein into tank unit 2. Disposed beneath pipe 40 is a smaller diameter pipe 42, preferably on the order of two inches in diameter, utilized for containing liquid or grey water waste from residence 38 into the tank assembly. As is shown in FIG. 3, the inner end of pipe 42 extends through the sidewall of tank unit 2, and has an inner, bypass segment 42a. Segment 42a inclines downwardly across upper tank unit 2 to a point of connection with baffle 32. The inner end of pipe extension or bypass 42a passes through baffle segment 32 so as to direct liquid sewage directly into flow passage 34.

Prior to the installation of sewage pipes 40 and 42, the first excavation 20 is dug to a predetermined level as noted above. This excavation will have a predetermined area sufficient to contain the liquid effluent from the tank assembly under conditions of continuous operation and to serve as a dispersion reservoir as hereinafter explained. The peipheral boundary of the area of excavation 20 is indicated by reference numeral 44 in FIG. 2. It has been found that an area of 1200 sq. ft. and a depth of approximately three feet provides a dispersion reservoir sufficient to handle the liquid effluent from a tank assembly having a total liquid capacity of approximately 1500 gallons. Deeper excavation 18 is initially dug along an inclined grade line 19. After the tank assembly is installed in the excavation with the bottom wall 16 of lower tank unit 4 resting on the bottom of excavation 18, earth backfill 46 is placed in the space surrounding lower tank unit 4 and collar 22, preferable to a level even with excavation 20. In order to ensure that liquid effluent discharging from the tank assembly will not penetrate the surrounding ground and pollute the ground waters, a liquid impervious sealing means is provided over the surface of the entire excavation 20 defining the dispersion reservoir surrounding the tank assembly 1, as shown in FIG. 1. Such sealing means preferably takes the form of a plastic liner sheet 48 utilized on conjunction with collar 22. Liner sheet 48 may be made of various materials. I have found it particularly desirable to utilize a double liner sheet to ensure no opportunity for effluent to reach the surrounding subsoil. The outside liner sheet, place in the excavation first, is preferably a single piece of DuPont "Fabrene" plastic. This woven polyolefin material is on the order of seven mil thickness and extremely resistant to puncture and tearing. The second or upper liner sheet is a single piece of cross-laminated polyethylene sheeting sold by Sto-Cote Products of Richmond, Illinois under the name "Tu-Tuf". This sheeting material is placed over the entire surface of upper excavation 20, all the way to the ground level as shown in FIG. 1. The sealing means engages tank assembly 1 in sealing contact therewith at a location below liquid discharge apertures 24. This is accomplished by providing a central aperture 50 in the liner 48, which permits the liner to be slipped over tank assembly 1 and positioned as shown over the surface of excavation 20. At least the inner end of liner sheet 48 around central aperture 50 extends generally horizontally and is sealed to the top, upper periphery of collar 22. This is advantageously accomplished by providing a generally horizontally extending flange lip 22a on the upper end of collar 22. The inner end of liner 48 lies on top of flange lip 22a around aperture 50, and is sealed to lip 22a by epoxy or other suitable adhesive means. Thus, collar 22 and liner 48 combine together to provide a liquid impervious sealing means over the entire surface of the dispersion reservoir defined by excavation 20, completely around tank assembly 1. This has been found to be a much more effective sealing means than extending the liner 48 over the entire bottom surface of excavation 18 under bottom wall 16 of lower tank unit 4. The weight of the tank assembly 1 on the liner sheet tends to pull it over the irregular surface of the excavation and cause tears with resulting leaks of effluent liquid from the dispersion reservoir.

The dispersion reservoir defined by excavations 19-20 is filled with particulate material of predetermined size and grade. A first layer of rock 52 is put into the excavation over the bottom surface of excavation level 20 as shown in FIGS. 1 and 3. The rock layer extends all the way to the edges of the excavation as shown. The rocks in layer 52 are preferably no smaller than ¾ inch and no longer than 4 inches in diameter, and free from clay and other soil. The rock layer extends for a height of approximately one foot above the bottom surface of excavation 20. A layer of clean, medium coarse sand is placed on top of rock bed 52 to a height of approximately one foot above the domed top 6 of upper tank unit 2. The sand bed 54 is domed on its top surface as shown in FIGS. 1 and 3. This diverts rainwater downwardly and outwardly away from the dispersion reservoir, and thereby assists in the evaporation of liquid effluent from rock bed 52.

An inspection pipe 56 having a capped upper end is inserted into the dispersion reservoir at a location as shown in FIGS. 2 and 3. Pipe 56 is oriented vertically with its bottom end extending into rock bed 52. The bottom end of pipe 56 has a plurality of openings 57 therein. By means of a dipstick inserted into inspection pipe 56, the level of liquid effluent within rock bed 52 can be determined. Also, a plurality of flush pipes 58 are installed in vertically oriented positions at laterally spaced locations around the area of the dispersion reservoir as shown in FIGS. 2 and 3. Flush pipes 58 are also perforated at their lower ends within rock bed 52 in the same manner as is done with respect to openings 57 in inspection pipe 56. Flush pipes 58 have removable caps on their upper ends and are adapted to be coupled to hoses.

In operation, sewage passing through the disposal system disclosed herein is treated in four progressive stages, thereby ensuring that the final effluent discharge is of almost potable quality. The first stage of treatment takes place in the upper tank unit 2. Household toilet and kitchen wastes, carrying biologically active sewage, are deposited in the top of upper tank unit 2 through pipe 40 and inlet port 28. Waste wash water or grey water is diverted directly into the lower tank unit 4 through bypass pipe 42a, thereby effectively separating organic and inorganic wastes. Thus, the biological matter in the upper compartment is concentrated, speeding up natural processes of biochemical oxidation. Baffle 36 prevents solids and sludge from flowing over the top of baffle 32 into flow passage 34 leading to lower tank unit 4. A liquid column is maintained within flow passage 34, as liquid flows under the bottom of baffle 36 and upwardly over the top of baffle 32 to provide a liquid level within tank unit 2 at the top of baffle 32. The first stage of anaerobic biological treatment which takes place in the upper tank unit 2, continues on the mixture of liquid effluent from tank unit 2 and wash water from bypass pipe 42a in lower tank unit 4. Further anaerobic digestive breakdown of the effluent/grey water mixture takes place in lower tank 4. In the process of anaerobic digestion, bacteria in the sewage, which do not depend on oxygen availability, act on the sewage and break down the solids to provide a liquid effluent.

Liquid effluent flows upwardly and outwardly within lower tank unit 4 around the outside of cylindrical guide baffle 26, and is thereby directed towards discharge apertures 24. The column of liquid maintained within flow passage 34 provides hydrostatic pressure which continuously forces liquid effluent upwardly and outwardly through discharge apertures 24 into the annular space within collar 22, and thence upwardly and outwardly within rock bed 22. Within rock layer or bed 52, a third stage of treatment takes place in the form of aerobic digestion. The granular size of the sand layer 54 and the size and grade of the rocks within rock bed 52 are such as to provide interconnecting voids within the sand and rock layers. Thus, air permeates downwardly through the sand and rock layers to provide a source of oxygen, which catalyzes the natural process of aerobic biochemical oxidation in the third treatment stage. In this stage, the residue from detergents, greases, phosphates, ferrous sulfide and other resistant compounds, as well as any remaining organic material, is treated and reduced, thereby preventing surface clogging within the rock and sand beds.

The hydrostatic pressure provided by the column of liquid within flow passage 34 is very important in forcing the liquid effluent from lower tank unit 4 upwardly through the combined space within collar 22 and into rock bed 52. This hydrostatic pressure not only causes the liquid effluent to percolate upwardly through the rock bed 52 to effectively carry out the aforesaid third, aerobic stage of digestion, but also to enhance the evaporation of the liquid effluent from the rock bed 52. Normally, a level of liquid effluent will be maintained within rock bed 52 near the surface thereof. The pressure differential of this body of liquid effluent within the dispersion reservoir over the surrounding atmospheric pressure created by the column of liquid within flow passage 34 enhances and accelerates evaporation. As the liquid effluent evaporates, it rises upwardly through sand layer 54. As the vapors pass through the layer of medium coarse sand 54, they are filtered in a final treatment stage. This fourth stage of treatment by sand filtration removes coliform, bacteria and viruses which are destroyed by the aerobic oxidation process. The sand filter also ensures the absorption of odors resulting from the sewage treatment processes.

Evaporation of liquid effluent within rock bed 52 is also accelerated by the heating of the liquid effluent due to the heat generated by the digestive anaerobic processes that occur within upper and lower tank units 2 and 4. Inside the tank assembly 1, the composition of the waste solids creates considerable heat, due to the anaerobic bacterial action. The tank unit, and the effluent produced, maintains a constant temperature of approximately 60 degrees F. Because of the resulting relatively high temperature of the liquid effluent flowing into the rock bed 52, in comparison with the temperature at the effluent—rock—air interface level, the rate of evaporation is considerably increased. Thus, even in winter, a high rate of evaporation occurs because the effluent is so much warmer than the surrounding air. Also, evaporation is enhanced by the specially selected rock and medium coarse sand layers which provide large void spaces and thereby allow air to circulate freely through the liquid effluent surface within rock bed 52. Also, the dome shaped surface of sand bed 54 further improves the rate of evaporation of the liquid effluent by providing more surface area and exposing this area to surface winds.

I have also found that total discharge of the liquid effluent to the surrounding atmosphere can be enhanced and accelerated by planting shrubbery and plants within sand bed 54. The roots of such plantings consume the liquid effluent as nutrients for vegetational growth. The transpiring liquid escapes from the plants as vapor, principally through the plant leaves, into the surrounding atmosphere.

The alternate wetting and drying of the rock and sand layers by the evaporation of liquid effluent therefrom causes aggregation of organic material on the rock and sand particles. A film or organic residue collects primarily on the rocks as liquid effluent evaporates therefrom. Aggregation on the rock particles is also enhanced by the growth of plant roots in the sand layer and resulting organic decomposition therefrom. The aggregation of finely divided organic matter on the rock particles increases the porosity of the entire rock bed. As a result, the infiltration rate of air therethrough increases accordingly, thereby further enhancing the rate of evaporation of liquid effluent from the rock bed.

From time to time, as desired and necessary the entire system can be flushed out by utilizing flushing pipes 58. For this purpose, cover 10 is removed from top wall 6 of upper tank unit 2. Flushing hoses are connected to the top of backflushing pipes 58, and a suction hose is inserted into the tank assembly 1 through service port 8. As water under pressure is introduced through pipes 58, it discharges through the lower, perforated ends thereof into rock bed 52. The water flushes through the rock bed and cleans it out, as the water enters lower tank unit 4 through its discharge apertures 24. The upper and lower tank units are pumped out, and the backflushing water is withdrawn from rock bed 52 by a suction hose inserted into service port 8.

The sewage disposal system of my invention has been disclosed herein with respect to a preferred embodiment. Various changes may be made in the system while still obtaining the desirable results set forth herein. For example, if the soil within which the system is installed is particularly hard, compact and relatively non-porous, the liner 48 may not be necessary to prevent undue seepage of liquid effluent into the soil. Also, in those areas where a limited amount of liquid seepage into the soil may be tolerated, liner 48 may also be eliminated. I anticipate that various other changes may be made in the size, shape and construction of the tank assembly 1 disclosed herein, as well as in the surrounding dispersion reservoir without departing from the spirit and scope of my invention as defined by the following claims.

What is claimed is:

1. A waste treatment system comprising:

a tank assembly comprising an upper tank unit having sewage inlet means and a lower tank unit disposed below said upper tank unit, said upper and lower tank units having sidewalls, with said upper tank unit having a top wall and said lower tank unit having a bottom wall, a dividing wall between said tank units, and said lower tank unit being connected in fluid flow communication with said upper tank unit, whereby sewage is initially reduced in first and second stages of anaerobic digestion in said upper and lower tank units;

baffle means extending vertically within said upper tank unit to a predetermined liquid level therein and having a bottom, outlet end in fluid flow communication with said lower tank unit, said baffle means defining a generally vertically extending flow passage through which liquid flows from said upper tank unit into said lower tank unit and within which a column of liquid is maintained to exert hydrostatic pressure on liquid within said lower tank unit;

liquid effluent discharge means in said lower tank unit opening into the space around said lower tank unit;

a dispersion reservoir surrounding said tank assembly, said reservoir comprising an excavation in the ground of predetermined area and depth around said tank assembly within which said tank assembly is disposed;

liquid impervious sealing means extending from the top of said reservoir excavation over the surface thereof and engaging said tank assembly in sealing contact therewith at a location thereon below said liquid effluent discharge means; and particulate material of predetermined size and grade filling said reservoir, whereby liquid effluent is forced under the hydrostatic pressure of said liquid column from said lower unit discharge means upwardly and outwardly through said particulate matter within said reservoir and evaporates therein, with the resulting vapors dispersing to the atmosphere through said particulate material.

2. A waste treatment system as defined in claim 1 wherein:

said sealing means comprises a liner sheet apertured to define a central opening through which said tank assembly extends, and a generally vertically extending collar encircling said tank assembly in outwardly spaced relation with respect thereto, the bottom periphery of said collar abutting the outside of said lower tank unit in sealing contact therewith at a level below said discharge means, and said liner being sealed around said central aperture to the top periphery of said collar, whereby liquid effluent flows outwardly from said lower tank unit through said discharge means into the annular space between said collar and said tank assembly and thence upwardly and outwardly through said particulate material and is contained within said reservoir by said liner sheet and said collar.

3. A waste treatment system as defined in claim 1 wherein:

said collar has a generally horizontally extending flange ring on the top periphery thereof on which said liner rests and to which said liner is sealed around said central opening.

4. A waste treatment system as defined in claim 3 wherein:

said liquid effluent discharge means comprises a plurality of apertures circumferentially spaced around the outer periphery of said lower tank unit.

5. A waste treatment system as defined in claim 4 wherein:
said lower tank unit is formed by upstanding wall means or corrugated configuration defining peripheral, outwardly convex ribs lying in substantially horizontal planes, and said apertures are disposed in an upwardly and inwardly inclined face of one of said ribs so as to direct liquid effluent upwardly and outwardly into the annular space between said collar and said tank assembly.

6. A waste treatment system as defined in claim 1 wherein:
said particulate material comprises a first layer of rock of predetermined size on the surface of said excavation and a second layer of sand on top of said rock layer, the upper surface of said sand layer being exposed to the atmosphere, whereby liquid effluent discharging from said lower tank unit through said discharge means evaporates within said rock layer, with the resulting vapors flowing upwardly through said sand layer and being filtered therein before dispersing to the atmosphere.

7. A waste treatment system as defined in claim 6 wherein:
said rock layer extends into the annular space defined between said collar and said tank assembly.

8. A waste treatment system as defined in claim 6 wherein:
said top wall of said upper tank unit has a service opening therein;
a removable cover over said service opening; and
a plurality of upright flush pipes laterally spaced apart within said reservoir, each of said flush pipes having an upper end adapted to be attached to a fluid hose and a lower end with openings therein disposed within said rock layer, whereby pressurized fluid may be introduced into said flush pipes and pumped out through said service opening to backflush said rock layer and said tank units.

9. Waste treatment apparatus comprising:
a tank assembly comprising an upper tank unit having sewage inlet means and a lower tank unit disposed below said upper tank unit, each of said tank units having top, bottom and sidewalls, and said lower tank unit being connected in fluid flow communication with said upper tank unit, whereby sewage is initially reduced in first and second stages of anaerobic digestion in said upper and lower tank units;
means defining a generally vertically extending flow passage within said upper tank unit having an upper end into which fluid flows from said upper tank unit at a predetermined liquid level therein and a bottom end in fluid flow communication with said lower tank unit, whereby a column of liquid is maintained within said vertically extending flow passage which exerts hydrostatic pressure on liquid within said lower tank unit;
a generally vertically extending collar encircling said tank assembly in outwardly spaced relation with respect to the sidewalls of said tank unit and thereby defining therewith an annular discharge space, the bottom periphery of said collar abutting the outside of said lower tank unit in sealing contact therewith; and
liquid effluent discharge means in the sidewalls of said lower tank unit at a level above the location of sealing contact of the bottom periphery of said collar with said lower tank unit, whereby liquid effluent is forced upwardly and outwardly through said discharge means under the hydrostatic pressure of said liquid column into said annular discharge space for ultimate discharge.

10. Waste treatment apparatus as defined in claim 9 wherein:
said liquid effluent discharge means comprises a plurality of apertures circumferentially spaced around the periphery of the sidewalls of said lower tank unit.

11. Waste treatment apparatus as defined in claim 10 wherein:
said sidewalls of said lower tank unit are of corrugated configuration defining peripheral, outwardly convex ribs lying in substantially horizontal planes, and said apertures are disposed in an upwardly and inwardly inclined face of one of said ribs so as to be able to direct liquid effluent upwardly and outwardly into said annular discharge space.

12. Waste treatment apparatus as defined in claim 10 wherein:
a cylindrical guide baffle is secured at the upper end thereof to the inside face of the sidewalls of said lower tank unit at a location above said discharge apertures with its cylindrical walls spaced inwardly from the adjacent sidewalls of said lower tank unit, whereby liquid effluent discharging into said lower tank unit from said upper tank unit flows upwardly and outwardly around the outside of said cylindrical guide baffle and is thereby directed towards said discharge apertures.

13. A waste treatment system comprising:
a tank assembly comprising an upper tank unit having sewage inlet means and a lower tank unit disposed below said upper tank unit, said upper and lower tank units having sidewalls, with said upper tank unit having a top wall and said lower tank unit having a bottom wall, and said lower tank unit being connected in fluid flow communication with said upper tank unit through a generally horizontally extending dividing wall between said tank units, whereby sewage is initially reduced in first and second stages of anaerobic digestion in said upper and lower tank units;
means defining a generally vertically extending fluid flow passage within said upper tank unit through which liquid flows from said upper tank unit at a predetermined liquid level therein into said lower tank unit through said dividing wall therebetween and within which a column of liquid is maintained to exert hydrostatic pressure on liquid within said lower tank unit;
liquid effluent discharge means in the sidewalls of said lower tank unit opening into the space around said lower tank unit;
a service opening in said top wall of said upper tank unit;
a removable cover over said service opening;
a dispersion reservoir surrounding said tank assembly, said reservoir comprising an excavation in the ground of predetermined area and depth around said tank assembly within which said tank assembly is disposed;

particulate material of predetermined size and grade filling said reservoir around said tank assembly, said particulate material comprising a first layer of rock covering the bottom of said excavation to a predetermined depth, and a second layer of sand on top of said rock layer, with the top surface of said sand layer being exposed to the surrounding atmosphere, whereby liquid effluent is forced under the hydrostatic pressure of said liquid column from said lower unit discharge means upwardly and outwardly through said rock layer within which it evaporates, with the resulting vapors dispersing to the atmosphere through said sand layer; and a plurality of upright flush pipes laterally spaced apart within said reservoir, each of said flush pipes having an upper end extending through said sand layer and adapted to be attached to a fluid hose and a lower end with openings therein disposed within said rock layer, whereby pressurized fluid may be introduced into said flush pipes to flow through said rock layer and into said tank units through said liquid effluent discharge means in said lower tank unit and pumped out through said service opening to thereby backflush said rock layer and said tank units.

14. A waste treatment system as defined in claim 13 wherein:

the surface of said reservoir excavation is covered by liquid impervious sealing means extending from the top of said reservoir excavation over the surface thereof and engaging said tank assembly in sealing contact therewith at a location thereon below said liquid effluent discharge means.

15. A waste treatment system as defined in claim 14 wherein:

said sealing means comprises a liquid impervious liner sheet apertured to define a central opening to which said tank assembly extends, and a generally vertically extending collar encircling said tank assembly in outwardly spaced relation with respect thereto, the bottom periphery of said collar abutting the outside of said lower tank unit in sealing contact therewith at a level below said discharge means, and said liner being sealed around said central aperture to the top periphery of said collar, whereby liquid effluent flows outwardly from said lower tank unit through said discharge means into the annular space between said collar and said tank assembly and thence upwardly and outwardly through said rock layer for evaporation upwardly through said sand layer.

16. A waste treatment system as defined in claim 15 wherein:

said reservoir excavation is comprised of a first excavation level on which said liner sheet rests, and a second, deeper excavation level on which said lower tank unit rests, said liner sheet extending generally horizontally over the innermost part of said first excavation level to its location of sealing contact with the top periphery of said collar.

17. A waste treatment system as defined in claim 6 wherein:

the top surface of said sand layer is of convex shape, thereby providing a greater surface area to enhance dispersal to the surrounding atmosphere of vapors evaporating from liquid effluent in the dispersion reservoir.

* * * * *